E. R. LYON.
INSECT DESTROYER.
APPLICATION FILED APR. 17, 1909.
986,925.
Patented Mar. 14, 1911.
3 SHEETS—SHEET 1.
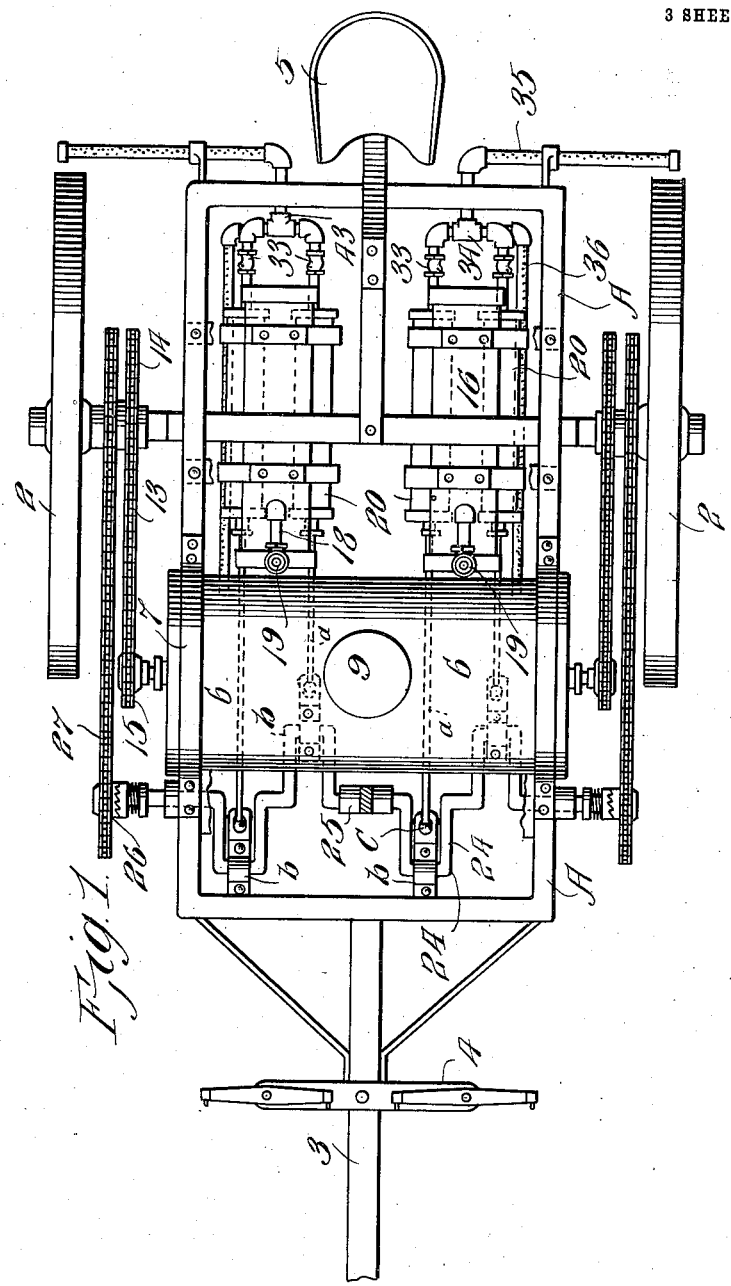
Witnesses
Frank Hough
C. Brodway.
Inventor
Edwin R. Lyon,
By Victor J. Evans
Attorney

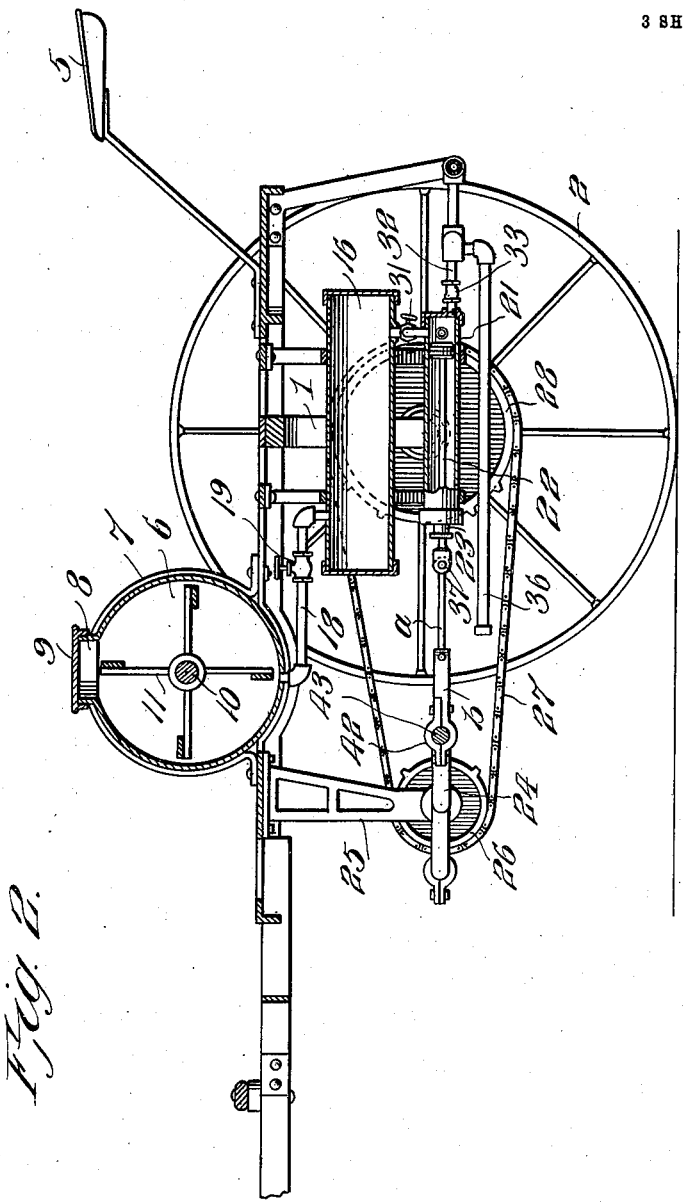

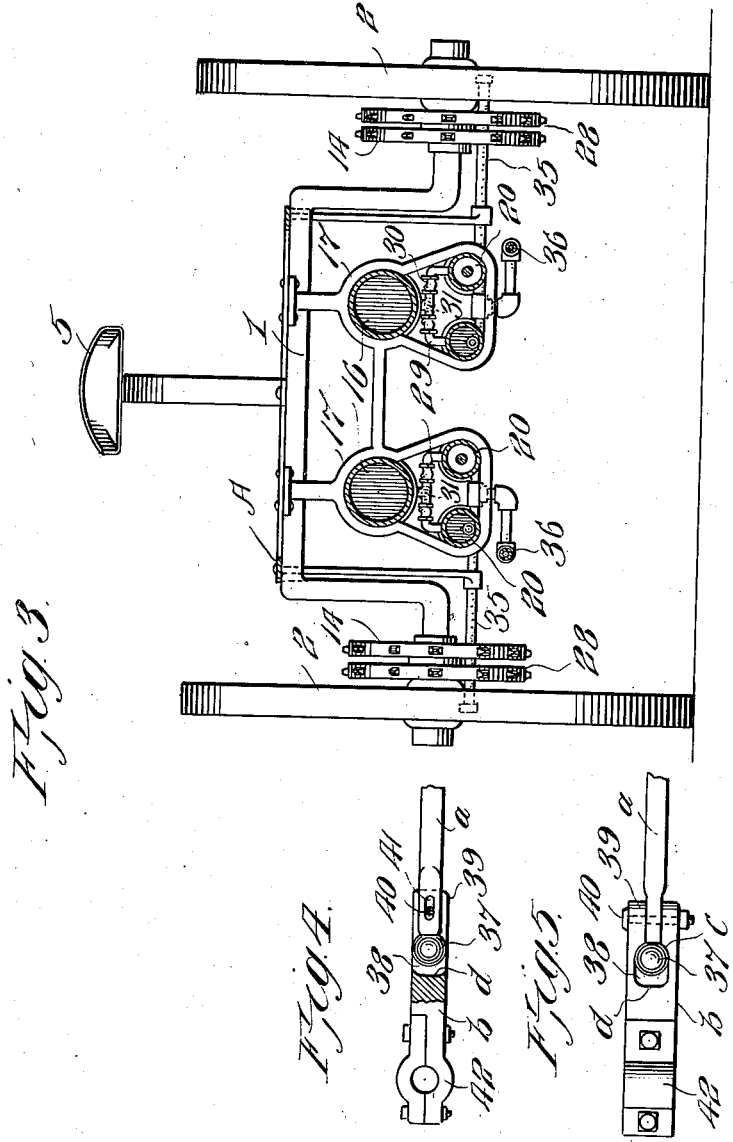

UNITED STATES PATENT OFFICE.

EDWIN R. LYON, OF QUEEN, TERRITORY OF NEW MEXICO.

INSECT-DESTROYER.

986,925.   Specification of Letters Patent.   Patented Mar. 14, 1911.

Application filed April 17, 1909. Serial No. 490,464.

*To all whom it may concern:*

Be it known that I, EDWIN R. LYON, a citizen of the United States, residing at Queen, in the county of Eddy and Territory of New Mexico, have invented new and useful Improvements in Insect-Destroyers, of which the following is a specification.

This invention relates to insect destroyers and more particularly to spraying devices of the vehicle type whereby a plurality of rows of plants can be sprayed as the vehicle is driven through the field.

The invention has for one of its objects to improve and simplify the construction and operation of devices of this character so as to be comparatively simple and inexpensive to manufacture, reliable and efficient in use, and readily manipulated.

Another object of the invention is the provision of a spraying machine whereby a plurality of pumps deliver the spraying liquid through separate spraying pipes to the plants, and whereby two or more rows can be sprayed at the same time, the liquid being drawn from auxiliary tanks that are connected with a common tank in which is contained a continuously-operated agitator.

With these objects in view and others, as will appear as the description proceeds, the invention comprises the various novel features of construction and arrangement of parts which will be more fully described hereinafter and set forth with particularly in the claim appended hereto.

In the accompanying drawings, which illustrate one embodiment of the invention, Figure 1 is a plan view of the machine. Fig. 2 is a longitudinal section thereof. Fig. 3 is a transverse section. Figs. 4 and 5 are detail views of the pitman connections between the pump plungers and the crank shaft.

Similar reference characters are employed to designate corresponding parts throughout the views.

Referring to the drawings, A designates the frame of the vehicle which may be of any approved construction and mounted on an axle 1 that has its central portion arched to accommodate the auxiliary tanks and pumps, and on the ends of the axle are traction wheels 2. The vehicle, in the present instance, is provided with a draft device consisting of a tongue 3 and whiffletree 4. Arranged on the axle is a seat 5 for the driver, the seat being conveniently arranged so that the valves for controlling the flow of the spraying liquid can be manipulated.

Arranged at the front of the vehicle frame is a transversely-extending reservoir or main tank 6 that is held in place by straps 7, and in the top of this tank is a filling opening 8 which is normally closed by a cap 9. Arranged within the tank is a central shaft 10 that carries a plurality of agitating arms 11 whereby the liquid will be continuously agitated during the movement of the vehicle, there being power-transmitting devices between the wheels 2 and shaft 10, which devices are in the form of sprocket chains 13 that pass around sprocket wheels 14 and 15 on the hubs of wheels 2 and ends of the shafts 10, respectively. In the present instance, the spraying machine is designed to spray two rows of plants at a time and for this purpose two sets of pumps are employed which receive liquid from auxiliary tanks 16 arranged in brackets 17 under the middle portion of the axle and extending longitudinally of the vehicle.

Between the main tank 7 and each auxiliary tank is a supply pipe 18 in such a manner that liquid will flow from the former to the latter by gravity, and in each supply pipe is a valve 19 whereby liquid can be supplied to either set of pumps. Under each auxiliary tank 16 is a pair of parallel pump cylinders 20 supported on the brackets 17 and in each pump is a piston 21 that has a rod 22 extending out of the forward end of the tank through a packing box 23, and these plunger rods are connected with a crank shaft 24 that is supported in brackets 25 at the front end of the machine. The crank shaft is provided at its ends with sprocket wheels 26 around which pass sprocket chains 27 that are driven by sprocket wheels 28 on the hubs of the traction wheels 2. Between each auxiliary tank 16 and adjacent pair of pumps is a branch supply pipe 29 having check valves 30 which permit the liquid to flow from the auxiliary tank to the respective pumps and this pipe is provided with a hand-controlled valve 31 whereby either auxiliary tank and adjacent pumps can be closed, as for instance, when only one row of plants is to be sprayed.

Attached to the rear ends of the pump cylinders are discharge pipes 32 that have check valves 33 and these pipes are connected together by a union 34, and attached to this union are separate spray pipes 35 and 36, one of which extends transversely through the row and the other parallel therewith so that the plants will be effectively sprayed by the insecticide-liquid. The pitman connection between each piston rod and crank consists of two sections $a$ and $b$; the section $a$ being in the form of a rod pivotally connected at its rear end 37 with the plunger rod and having its forward end formed into a spherical enlargement or ball 37 which is disposed in a socket or opening 38 in the section $b$, there being a slot extending rearwardly from the socket to present parallel members 39 between which the rod $a$ extends. The rod section is held in place with respect to the section $b$ by a bolt 40 that extends through the members 39 and also through a slot 41 in the rod section $a$. By this construction, the connecting bolt 40 is subjected to no strain, since the enlargement 37 bears against the walls of the socket 38 at $c$, when the pump piston is moved forwardly and bears against the wall of the socket at $d$ during the rear stroke of the piston. The section $b$ of the pitman is provided with a bearing 42 for receiving the crank pin 43 of the shaft 24.

From the foregoing description, taken in connection with the accompanying drawings, the advantages of the construction and of the method of operation will be readily apparent to those skilled in the art to which the invention appertains, and while I have described the principle of operation of the invention, together with the apparatus which I now consider to be the best embodiment thereof, I desire to have it understood that the apparatus shown is merely illustrative, and that such changes may be made when desired as are within the scope of the claim appended hereto.

Having thus described the invention, what I claim is:—

A machine of the class described comprising a frame including an axle, wheels on the axle, a main tank mounted on the frame, auxiliary tanks extending longitudinally of the machine and disposed under the axle, valved connections between the main tank and the respective auxiliary tanks, a two-cylinder pump disposed under each auxiliary tank, valve-controlled connections between respective cylinders of each pump and adjacent auxiliary tank, said cylinders extending horizontally and disposed longitudinally of the machine, a common means for rigidly supporting the cylinders and auxiliary tanks on the said frame, and a spraying device connected with the discharge of each pump.

In testimony whereof I affix my signature in presence of two witnesses.

EDWIN R. LYON.

Witnesses:
 CARL ALFORD,
 C. A. MCCLURE.